United States Patent [19]

Franklin

[11] E Re. 29,518

[45] Reissued Jan. 17, 1978

[54] STIRLING CYCLE HEAT ENGINES

[75] Inventor: Ernest Franklin, Abingdon, England

[73] Assignee: United Kingdom Atomic Energy Authority, London, England

[21] Appl. No.: 690,298

[22] Filed: May 26, 1976

Related U.S. Patent Documents

Reissue of:

[64] Patent No.: 3,802,196
Issued: Apr. 9, 1974
Appl. No.: 271,713
Filed: July 14, 1972

[30] Foreign Application Priority Data

Aug. 2, 1971 United Kingdom ..... 36317/71

[51] Int. Cl.[2] ..... F02G 1/04
[52] U.S. Cl. ..... 60/520
[58] Field of Search ..... 60/517-526

[56] References Cited

U.S. PATENT DOCUMENTS

| | | | |
|---|---|---|---|
| 3,456,438 | 7/1969 | Meijer | 60/520 |
| 3,552,120 | 1/1971 | Beale | 60/525 |

*Primary Examiner*—Allen M. Ostrager
*Attorney, Agent, or Firm*—Larson, Taylor and Hinds

[57] ABSTRACT

A Stirling cycle heat engine comprises hot and cold variable volume chambers intercommunicating through a regenerator. Various components flexibly mounted to provide the variable volume chambers are tuned to resonate with a relationship compatible with operation of the engine. In one embodiment the whole engine is flexibly mounted for bodily oscillation. In another embodiment a gas-displacer member and a gas-actuated member are disposed in a closed vessel of cylindrical form.

22 Claims, 8 Drawing Figures

Fig. 1.
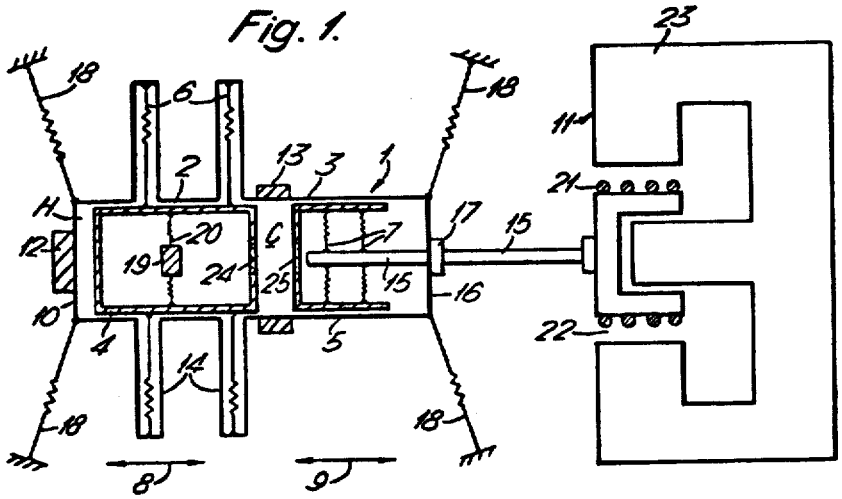
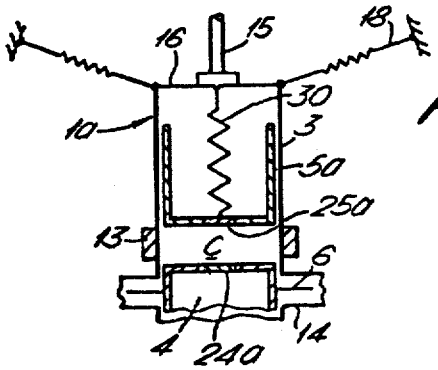
Fig. 2.
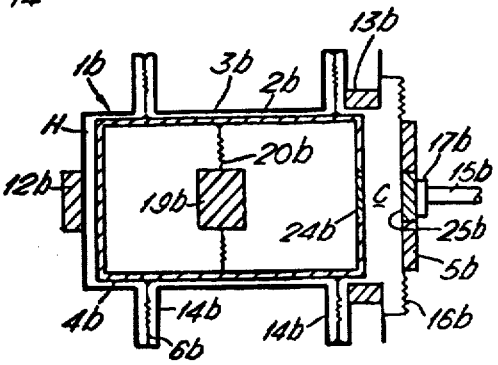
Fig. 3.

Fig. 4.
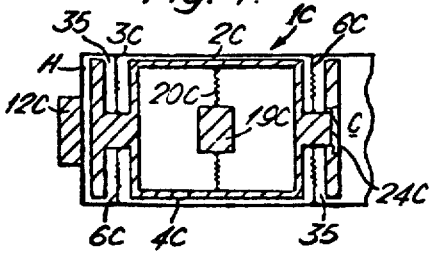
Fig. 5.
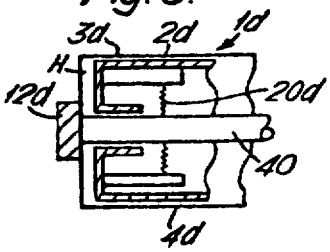
Fig. 6.
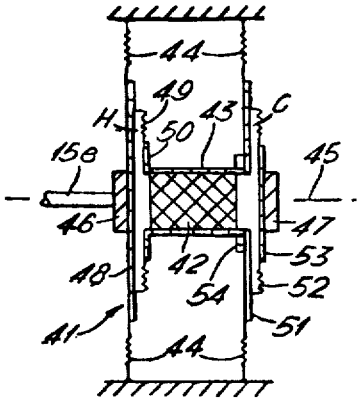
Fig. 7
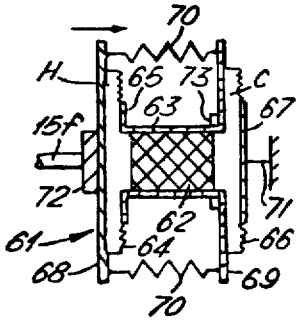
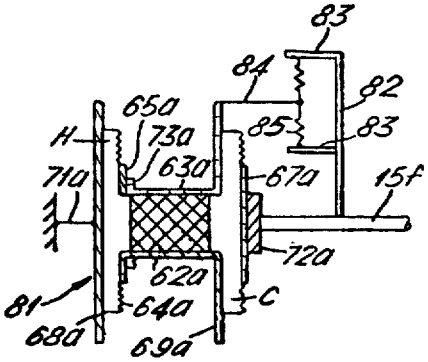
Fig. 8.

STIRLING CYCLE HEAT ENGINES

Matter enclosed in heavy brackets [ ] appears in the original patent but forms no part of this reissue specification; matter printed in italics indicates the additions made by reissue.

This invention relates to Stirling cycle heat engines. British Pat. No. 1,252,258 to which reference should be made, relates to a Stirling cycle heat engine provided with hot and cold variable volume chambers inter-communicating through a regenerator, each of the chambers incorporating flexible structure capable of repetitive deflection. Non-positive coupling means are provided to connect side portions of the hot and cold chambers, these side portions being movable by virtue of the flexible structure. The non-positive coupling means transmit force for maintaining reciprocating displacement of gas between the chambers and the operating components of the engine are tuned to resonate in correct phase relationship in response to the forces transmitted by the coupling means.

Various aspects of the present invention provide improvements in the invention disclosed by the said British Pat. No. 1,252,258.

According to a first aspect of the present invention, a Stirling cycle heat engine comprises hot and cold volume chambers inter-communicating through a regenerator through which gas is displaced between the chambers in a reciprocating manner, a closed vessel of cylindrical form, a gas-displacer member and a gas-actuated member disposed in tandem with at least one of said members disposed within the vessel, means for flexibly supporting the members so that the members can oscillate towards and away from each other, one of the hot and cold chambers being formed between one of said members and the adjacent end of the vessel and the other of said hot and cold chambers being formed between adjacent parts of the two members, and means for converting oscillating movement of one of the members into useful work.

According to a second aspect of the present invention, a Stirling cycle heat engine comprises a hot chamber at one end of the engine and a cold chamber at the other end of the engine, each of the hot and cold chambers being of variable volume, at least one regenerator disposed between and connected to the hot and cold chambers to provide inter-communication through which, in operation of the engines, gas is displaced between the chambers in a reciprocating manner, means for flexibly supporting the engine so that in operating it is free to oscillate bodily along an axis passing through the hot and cold chambers and tuning means for constraining operating components of the engine to resonate with a relationship compatible with operation of the engine.

According to a third aspect of the present invention, a Stirling cycle heat engine comprises hot and cold variable volume chambers inter-communicating through at least one regenerator through which, in operation of the engine, gas is displaced between the chambers in a reciprocating manner, each of the chambers incorporating flexible structure capable of repetitive deflection, and resilient coupling means for converting some of the output of the engine into a force which maintains reciprocating displacement of gas between the chambers.

The resilient coupling may be positive or negative spring means.

Embodiments of the invention will now be described by way of example with reference to the drawings accompanying the provisional specification wherein:

FIG. 1 is a semi-diagrammatic view in side elevation of an engine according to the said first aspect of the invention.

FIGS. [3] *2* to 5 each illustrate a modification of the engine of FIG. 1.

FIG. 6 is a semi-diagrammatic view in side elevation of an engine according to the said second aspect of the invention.

FIGS. 7 and 8 are semi-diagrammatic views in side elevation of an engine according to the said third aspect of the invention.

In the figures, like reference numerals indicate like parts.

With reference to FIG. 1, a Stirling cycle heat engine 1 comprises hot (H) and cold (C) variable volume chambers intercommunicating through an annular regenerator-gap 2 through which helium gas is displaced between the chambers H, C, in a reciprocating manner. A closed vessel 3 of cylindrical form is provided and a gas-displacer piston member 4 and a gas-actuated piston member 5, both of hollow form, are disposed in tandem within the vessel 3. Radially disposed flexible stays 6 flexibly support the piston member 4 within the vessel 3 and flexible stays 18 are provided whereby the members 4, 5 can oscillate towards and away from each other about an axis passing through both members. (As indicated by the arrows 8, 9 and as described below). The hot chamber H is formed between the "displacer" piston member 4 and the adjacent end wall 10 of the cylinder 2 and the cold chamber C is formed between adjacent end parts of the piston members 4, 5. Electromechanical means comprising a magnet and coil assembly 11 are provided for converting oscillating movement of the piston member 5 into useful electrical work.

In further detail, a radioisotope heat source 12 is provided for heating the helium gas in the hot chamber H and a heat sink 13 is provided for extracting heat from the gas in the cold chamber C. The stays 6 are in two groups. The stays 6 of each group are equi-spaced, and extend radially from the piston member 4 to the ends of tubular extensions 14 which project radially outwards from the vessel 3.

Two groups of stays 7 extend radially outwards from an actuating shaft 15 of hollow form (which projects into the piston member 5) out to the skirt of the piston member 5 so as to support the latter out of frictional contact with the vessel 2. The shaft 15 extends lengthwise through the end wall 16 of the vessel 3 and is attached to the end wall by a flange 17. The vessel 3 is supported at its ends by the flexible stays 18 so that it "floats" in mid air. As the actuating shaft 15 is attached to the vessel 3 the two move in a reciprocating manner as one.

A tuning mass 19 disposed within the piston member 4 provides an anchorage for radially disposed tuning spring 20. This internal arrangement of the springs 20 has the advantage that it does not result in an impedance of gas flow between the chambers H, C. However, if some impedance of this gas flow is acceptable, tuning springs disposed outside the piston member 4 may be used. For example, flat springs disposed at the ends of the piston member 4.

The electromechanical transducer provided by the magnet and coil assembly 11 comprises a movable coil 21 carried by the shaft 15 and movable in the annular gap 22 of a pot magnet 23. The assembly 11 is thus similar to the magnet and coil assembly of a moving coil radio loudspeaker. However, a moving iron assembly may be used instead of the moving coil assembly 11.

In operation, heat is continuously applied to the helium gas in the hot chamber H by way of the heat source 12 and is extracted from the cold chamber C by way of the heat sink 13. The helium gas is caused to move between chambers H, C, by way of the annular gap 2 in a reciprocating manner by oscillation of the displacer piston member 4 and with a cyclic change of temperature and pressure. The "power" piston member 5 is caused to oscillate by pressure changes occurring in the displaced gas. The piston members 4, 5 oscillate with a relative difference in phase. If the amplitudes of oscillation of the piston members 4, 5 are not large enough to overlap, then for given swept volumes of the piston members the power output is maximum when the motions of the piston member 5 lag behind those of the member 4 by 90°. Should the amplitudes overlap however, where the volume variations of the hot and cold chambers H, C are equal, (as in the present example) the optimum phase lag is 45°. The gas pressures in each of the chambers H, C, are always substantially equal and rise and fall together as the gas is alternately heated and cooled. It will be noted that the effective areas of the piston members 4, 5 are equal. Expansion and contraction of the gas is substantially isothermal.

The relatively small annular gap 2 defined the vessel 3 and the piston member 4 serves as a regenerator as well as a gas flow passage between the hot and cold chambers H, C. This simple form of regenerator operates by the giving up of heat to and by the extraction of heat from the adjacent surfaces of the piston member 4 and vessel 3.

Oscillation of the piston member 5 (and thus the vessel 3) causes oscillation of the moving coil 21 in the annular gap 22 of the magnet 23. This causes an electrical alternating current to be generated which can be used to perform useful work. As the heat source 12 is a radioisotope, the engine may have a very long life and need little or no attention during its life. In practice, to keep the engine working, some of the energy given up in moving the rod 15 needs to be fed back to the engine. This can be done by using any of the "feed-back" arrangements referred to in British Pat. No. 1,252,258.

Alternatively, feed back can be achieved by the arrangement shown in FIG. 1 wherein oscillation of the gas-displacer piston member 4 is maintained by feeding back a force from the piston member 5.

As shown in FIG. 1, a magnet 24 is incorporated in one end face of the piston member 4 and a piece 25 of magnetic material is incorporated in the adjacent end face of the piston member 5 so that the piece 25 is attracted towards the magnet 24. Thus as gas pressure falls in the cold chamber C and the piston member 4 moves towards the piston member 5, magnetic forces act to accelerate this movement which also accelerates displacement of gas into the hot chamber H.

The magnet 24 and piece 25 never actually contact each other because the tendency to draw the piston members 4 and 5 together is limited by tension in the flexible stays 6 which then act resiliently to pull the piston member 4 back towards the hot chamber H and thus tend to move the piston members 4 and 5 apart. As the piston member 4 is pulled back towards the hot chamber H it displaces gas from that chamber into the cold chamber C, and, as it reaches the end of its stroke, tension in the flexible stays 6 act to pull it back towards the cold chamber C so as to displace gas from that chamber, and so as to bring the magnet 24 and piece 25 towards each other again whereupon the cycle is repeated.

The effect of the magnet 24 may be varied by adjustment of shunt or series gaps incorporated in the magnetic circuit. These gaps may be caused to vary with the position of the "power" piston member 5, relative to the engine mounting.

The "power" member 5 is displaced outwardly by a rise in gas pressure within the vessel 3. This displacement causes simultaneous and corresponding displacement of the rod 15 and vessel 3 until tension in the stays 18 at the "hot" end of the engine pulls the vessel 3, rod 15 and piston member 5 back in the opposite direction. Gas pressure displacement of the piston member 5, plus tension in the stays 18 at the "cold" end of the engine then cause these components to reverse direction once again. The whole engine is tuned so that the piston members 4 and 5 oscillate with the desired difference in phase.

The piston members 4, 5 need not be supported by radial stays. They can be supported, for example, by flat springs at their ends.

With reference to FIG. 2, the engine may be arranged in an up-right position. When this is done the second piston member 5a may be allowed to "float" freely on a long spring 30 attached to and extending between the head of the member 5a and the end wall 16 of the vessel 1. The spring 30 thus replaces the stays 7 and the inner part of the rod 15 of FIG. 1.

In the engine 1b of FIG. 3, the gas-actuated member 5b is not disposed within the vessel 3b but instead forms part of the vessel end wall 16b. The remainder of the end wall 16b is of flexible form so as to allow the member 5b to oscillate towards and away from the member 4b.

In the engine 1c of FIG. 4, the piston member 4c is formed with radially disposed cylindrical cavities 35 at its ends and flexible support stays 6c within these cavities attach the piston member 4c to the wall of the vessel 3c.

In the engine 1d of FIG. 5, the piston member 4d has annular end parts and oscillates within the vessel 2d on a central guide shaft 40 of tubular form.

Some of the above-described modifications may be combined with each other. Other modifications may be made. For example, with reference to the engine 1 of FIG. 1 the vessel 2 could be made stationary and output taken from the piston member 5 by way of a flexible end wall 16. The relative positions of the members 4, 5 may also be reversed.

FIG. 6 shows a Stirling cycle engine 41 of simple construction comprising a hot chamber H at one end of the engine and a cold chamber C at the other end of the engine. Each of the hot and cold chambers H, C, are of variable volume. A single, centrally disposed regenerator 42 housed in a tubular casing 43 is disposed between and connected to the hot and cold chambers to provide intercommunication through which, in operation of the engine, helium gas is displaced between the chambers in a reciprocating manner. Radially disposed flexible stays 44 comprise means for flexibly supporting the engine 41 so that in operation it is free to oscillate bodily along a central horizontal, axis 45 passing through the hot and cold chambers H, C. Tuning masses 46, 47, 54 are provided for constraining operating components of the engine 41 to resonate with a relationship compatible with operation of the engine.

In further detail, the outer wall of the hot chamber H comprises a circular end plate 48 and the inner wall a flexible diaphragm 49 stiffened by a central boss 50 of annular form to which one end of the regenerator casing 43 is attached. The inner wall of the cold chamber C comprises an annular plate 51, to which the other end of the casing 43 is attached. The outer wall of the cold chamber C comprises a flexible diaphragm 52 stiffened by a central boss 53. The tuning mass 46 is attached to the end plate 48 and the tuning mass 47 to the central boss 53. An output shaft 15e, disposed on the axis 45, extends outwardly from the end plate 48 through the tuning mass 46. The tuning mass 54 comprises an annular plate fitted over the regenerator casing 43 and attached to the end plate 51.

In operation, the tuning masses 46, 47, 48 ensure that the hot end (plate 48), cold end (diaphragm 52) and displacer (plate 51) parts of the engine 41 maintain the desired relative resonating motions. Although the output shaft 15e is shown at the hot end of the engine it may alternatively be disposed at the cold end thereof providing that the tuning masses are adjusted appropriately.

The stays 44 are sufficiently flexible to ensure that the various masses of the engine 1 balance each other as the engine oscillates along the axis 45.

FIGS. 7 and 8 illustrate Stirling cycle heat engines provided with resilient couplings for "feeding-back" some of the output of each engine.

With reference to FIG. 7, an engine 61 comprises hot and cold variable chambers H, C, intercommunicating through a single, centrally disposed regenerator 62 housed in a tubular casing 63 through which, in operation of the engine, helium gas is displaced between the hot and cold chambers in a reciprocating manner. Each of the chambers H, C, incorporates flexible structure capable of repetitive deflection for the life of the engine. The hot chamber H incorporates a flexible diaphragm 64 stiffened by a central boss 65 of annular form which together form an inner wall of the chamber. The cold chamber C incorporates a flexible diaphragm 66 stiffened by a central boss 67, which together form an outer end wall of the chamber. The hot chamber H also incorporated a circular plate 68 which forms an outer end wall of the hot chamber, and the cold C a similar plate 69 which forms an inner end wall of that chamber. Resilient coupling means in the form of springs 70 interconnecting the plates 68, 69 are provided for converting some of the output of the engine 61 into a force which maintains reciprocating displacement of gas between the hot and cold chambers H, C.

In further detail, the "cold" end of the engine is made stationary, as indicated by the anchorage 71 attached to the base 67. The engine is provided with an output shaft 15f attached to the plate 68 at the "hot" end of the engine and tuning masses 72, 73 attached to the plates 68, 69 ensures that the hot end (plate 68) and displacer (plate 69) parts or components of the engine are constrained to maintain the desired relative resonating motions.

The tubular casing 43 of the regenerator 42 extends between and is connected to the base 65 and plate 69.

In operation, reciprocation of the plate 69, which serves as a displacer, lags by some suitable angle (in this case 90°) behind that of the plate 68. As the plate 68 reciprocates it applies a "pull" on the plate 69 by way of the springs 70. Thus some of the output of the engine is fed back to the displacer/plate 69 in the form of a force maintaining reciprocation displacement of gas between the chambers H, C. This "feed-back" of output compensates for energy loss forces experienced by the displacer/plate 69 as it reciprocates.

The springs 70 of FIG. 7 provide a direct or positive form of resilient coupling means. FIG. 8 shows that a Stirling cycle heat engine may be provided with indirect or negative form of resilient coupling means.

With reference to FIG. 8 an engine 81 is basically of the same form as the engine 61 of FIG. 7 save that in the engine 81 the "hot" end of the engine is made stationary.

The engine 81 is provided with resilient coupling means for converting some of the output of the engine 81 into a force which maintains reciprocating displacement of gas between the hot and cold chambers H, C.

These coupling means comprise at least two (one only being shown) equi-spaced arms 82 extending radially from the output shaft 15f. Each arm 82 is provided with a pair of radially spaced extensions 83 which extend substantially horizontally towards the "hot" end of the engine. Three arms 84 (one only being shown) are attached to and project substantially horizontally towards the "cold" end of the engine from the displacer/plate 69a. Each arm 84 is disposed substantially midway between a pair of extensions 83. A pair of springs 85 extend between the "free" end of each arm 84 and the "free" ends of the associated extensions 83. The resilient coupling assemblies 82, 83, 84, 85 act as toggles as some of the output of the engine is fed back from the output shaft 15f to the displacer/plate 69a.

The resilient coupling assemblies 82, 83, 84, 85 may be formed by any well known spring coupling.

To avoid any tendency for the toggle-like resilient coupling placing the displacer/plate 69a into an unfavourable position for starting the engine 81, the positive spring restoring force applied by the flexible diaphragm 66a to the displacer/plate 69a can be made to be fairly large relative to the negative spring force applied to the latter by the resilient coupling.

In the arrangements of FIGS. 6, 7 and 8, the single regenerator of each engine may be replaced by a plurality of regenerators.

The engines are preferably constructed from stainless steel. However, much of each engine may be constructed from quartz or ceramic material.

Although the gas used in the engine described above is helium, any other gas, such as for example hydrogen, possessing the characteristics of high thermal diffusivity and low viscosity and low mass (i.e., low gas friction properties) may be used.

Various aspects and features of the invention may be combined. For example, the engine 41 may be provided with the "feed-back" arrangement of FIGS. 7 or 8.

I claim:

1. A Stirling cycle heat engine comprising hot and cold variable volume chambers intercommunicating through a regenerator through which gas is displaced between the chambers in a reciprocating manner, a closed vessel of cylindrical form, a gas-displacer member and a gas-actuated member disposed in tandem *and located independently of one another so as to be free of frictional sliding movement relative to each other and* with at least one of said [chambers] *members* disposed within the vessel, resilient supports for flexibly supporting the members *so that they are out of frictional contact with the vessel and arranged so that at least one of the members is supported radially by the resilient supports*, the resilience of said supports permitting working movement of the members by oscillation towards and away from each other, one of the hot and cold chambers being formed between one of said members and the adjacent end of the vessel and the other of said hot and cold chambers being formed between adjacent parts of the two members, and means for converting oscillating movement of one of the members into useful work.

2. A Stirling cycle heat engine comprising a hot chamber at one end of the engine and a cold chamber at the other end of the engine, each of the hot and cold chambers being of variable volume, at least one regenerator disposed between and connected to the hot and cold chambers to provide intercommunication through which, in operation of the engine, gas is displaced between the chambers in a reciprocating manner, means for flexibly supporting the engine *radially* so that in operation it is free to oscillate bodily along an axis passing through the hot and cold chambers and tuning means for constraining operating components of the engine to resonate with a relationship compatible with operation of the engine.

3. A Stirling cycle heat engine comprising hot and cold variable volume chambers intercommunicating through at least one regenerator through which, in operation of the engine, gas is displaced between the chambers in a reciprocating manner, each of the chambers comprising relatively rigid structure joined by relatively flexible structure capable of repetitive deflection, and resilient coupling means for converting some of the output of the engine into a force which maintains reciprocating displacement of gas between the chambers.

4. An engine as claimed in claim 1, wherein the vessel and the said member disposed within it together define a regenerator gap.

5. An engine as claimed in claim 1, wherein both members are disposed within the vessel.

6. An engine as claimed in claim 1, wherein one member is disposed within the vessel and the other member forms part of an end wall of the vessel and is connected to the remainder of the vessel by flexible means.

7. An engine as claimed in claim 1, wherein the vessel is supported by flexible support means so that it can oscillate about an axis passing through both members.

8. An engine as claimed in claim 1, wherein the resilient supports for flexibly supporting one of the members comprise flexible support means extending radially between the said one of the members and the vessel.

9. An engine as claimed in claim 1, wherein the resilient supports for flexibly supporting one of the members comprise tension spring means extending between said one of the members and an end wall of the vessel.

10. An engine as claimed in claim 1, wherein the means for converting oscillating movement of one of the members into useful work comprise an electromechanical transducer.

11. An engine as claimed in claim 10 wherein said electromechanical transducer is connected to said gas-actuated member by flexible means.

12. An engine as claimed in claim 1, provided with means for feeding back to the engine some of the work done by the engine, said feed back means comprising magnetic means tending to draw the gas-displacer member and the gas-actuated member together and resilient means tending to subsequently move said members apart.

13. An engine as claimed in claim 8, wherein said flexible support means are disposed in cavities formed in said one of the members.

14. An engine as claimed in claim 1, wherein one of said gas-actuated member or said gas-displacer member is supported by a guide structure extending axially through the said one member.

15. An engine as claimed in claim 2 wherein each chamber comprises a rigid wall and a flexible wall.

16. An engine as claimed in claim 2, provided with means for converting oscillating movement of the engine into useful work.

17. An engine as claimed in claim 16 wherein said means comprise an electro-mechanical transducer.

18. An engine as claimed in claim 15 provided with an electromechanical transducer connected to the rigid wall of one of said chambers.

19. An engine as claimed in claim 3 wherein each chamber comprises a rigid wall and a flexible wall.

20. An engine as claimed in claim 19 wherein said resilient coupling means comprise positive spring means interconnecting the rigid walls of the hot and cold chambers.

21. An engine as claimed in claim 3 wherein said resilient coupling means comprise negative means interconnecting the rigid wall of one of the hot and cold chambers and the flexible wall thereof.

22. An engine as claimed in claim 1 wherein said resilient supports comprise spring means.

* * * * *